US008608231B1

(12) United States Patent
Mendivil et al.

(10) Patent No.: US 8,608,231 B1
(45) Date of Patent: Dec. 17, 2013

(54) VEHICLE STRUCTURAL FRAME WITH PARTIAL-OVERLAP-BARRIER-IMPACT DEFORMATION SCHEME

(75) Inventors: Andres Gonzalez Mendivil, Mexico City (MX); Bhimaraddi Venkaraddi Alavandi, Canton, MI (US); Adrian Diaz, Naucalpan (MX); Ranny Hamameh, Madison Heights, MI (US); Kirk D. Rasmussen, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/561,347

(22) Filed: Jul. 30, 2012

(51) Int. Cl.
*B60R 19/34* (2006.01)

(52) U.S. Cl.
USPC ............ 296/187.03; 296/187.09; 296/203.02; 296/187.1; 293/133; 293/155

(58) Field of Classification Search
USPC ............. 296/187.09, 193.09, 203.02, 187.03, 296/187.1; 293/132, 133, 155
See application file for complete search history.

(56) References Cited

U.S. PATENT DOCUMENTS

| 3,853,344 | A | 12/1974 | Shimoe | |
|---|---|---|---|---|
| 6,299,210 | B1 | 10/2001 | Ruehl | |
| 6,705,653 | B2* | 3/2004 | Gotanda et al. | 293/132 |
| 7,267,736 | B2 | 9/2007 | Hou | |
| 7,469,956 | B2* | 12/2008 | Yasuhara et al. | 296/187.09 |
| 7,533,913 | B2* | 5/2009 | Bae | 293/133 |
| 8,002,338 | B2* | 8/2011 | Yasuhara et al. | 296/203.02 |
| 8,020,907 | B2* | 9/2011 | Wibbeke et al. | 293/133 |
| 8,215,705 | B2* | 7/2012 | Gonin | 296/187.09 |
| 8,235,433 | B2* | 8/2012 | Gonin | 293/120 |
| 8,256,831 | B2* | 9/2012 | Abe et al. | 296/203.02 |
| 8,276,955 | B2* | 10/2012 | Baccouche et al. | 293/133 |
| 8,308,207 | B2* | 11/2012 | Fang et al. | 293/132 |
| 8,348,333 | B2* | 1/2013 | Iammarino et al. | 296/187.09 |
| 2002/0170766 | A1 | 11/2002 | Gantz et al. | |

(Continued)

FOREIGN PATENT DOCUMENTS

| JP | 2005022564 A2 | 1/2005 |
|---|---|---|
| JP | 2008162344 A2 | 7/2008 |
| WO | WO2009094090 | 12/2008 |

OTHER PUBLICATIONS

Hak-Sung Kim, Torque Transmission Characteristics of the Press Fit Joint Between the Aluminum Shaft and Steel Right with Small Teeth, Mechanics Based Design of Structures and Machines, Jan. 28, 2011, vol. 39, Issue 1, http://www.tandfoline.com/doi/abs/10.1080/15397734.538655.

(Continued)

*Primary Examiner* — Glenn Dayoan
*Assistant Examiner* — Gregory Blankenship
(74) *Attorney, Agent, or Firm* — Raymond L. Coppiellie; Brooks Kushman P.C.

(57) ABSTRACT

The present disclosure relates to a vehicle structural frame with an overlap-barrier-impact deformation scheme, the frame has: a rail defining a first longitudinal axis; a first energy absorption device defining a second longitudinal axis outside of the first longitudinal axis with respect to a vehicle; and a connector extending between the rail and the first energy absorption device.

17 Claims, 6 Drawing Sheets

(56) References Cited

U.S. PATENT DOCUMENTS

| | | | |
|---|---|---|---|
| 2006/0032895 A1 | 2/2006 | Durand et al. | |
| 2007/0215402 A1* | 9/2007 | Sasaki et al. | 180/232 |
| 2008/0054655 A1 | 3/2008 | Kizaki | |
| 2009/0188206 A1 | 7/2009 | Stol et al. | |
| 2010/0026047 A1* | 2/2010 | Baccouche et al. | 296/187.09 |
| 2010/0194145 A1* | 8/2010 | Akaki et al. | 296/187.08 |
| 2010/0259033 A1* | 10/2010 | Okabe et al. | 280/734 |
| 2011/0018248 A1 | 1/2011 | Cordea | |
| 2011/0095568 A1* | 4/2011 | Terada et al. | 296/187.09 |
| 2011/0121587 A1 | 5/2011 | Handing | |
| 2011/0133512 A1* | 6/2011 | Mildner et al. | 296/187.09 |
| 2012/0007373 A1* | 1/2012 | Boettcher et al. | 293/132 |
| 2012/0025546 A1 | 2/2012 | Haneda | |
| 2012/0086225 A1* | 4/2012 | Matsuura et al. | 293/132 |
| 2012/0187720 A1* | 7/2012 | Tomozawa et al. | 296/187.09 |
| 2012/0248820 A1* | 10/2012 | Yasui et al. | 296/187.09 |
| 2013/0207417 A1* | 8/2013 | Kihara et al. | 296/187.09 |

OTHER PUBLICATIONS

Kenneth Kremer, Metal Foams for Improved Crash Energy Absorption in Passenger Equipment, Sep. 1, 2004, http://onlinepubs.trb.org/onlinepubs/archive/studies/idea/finalreports/highspeedrail/hsr-34final_report.pdf.

Priya Prasad, Design of Vehicle Structures for Crash Energy Management, http://www.google.co.in/url? sa=t&rct=j&q=design%20of%20vehicle%20structures%20for%20crash%20energy%20management&source=web&cd=1&ved=0CDsQFjAA&url=http%3A%2F%2Fweb.iitd.ac.in%2F—achawla%2Fpublic_html%2F736%2F7-Design_of_Vehicle_Structures_for_crash_energy_management_v5.pdf&ei=VjRjT6btlMn3rQfW0vC8Bw&usg=AFQjCNHw_X6XhQmISNh-XobkZ9A2R17g9g&cad=rja, 2004.

Chris Sherwood, An Update on the IIHS Small Overlap Research Program, www.iihs.org, 2012 Government/Industry Meeting Washington, DC, Jan. 25, 2012.

\* cited by examiner

VEHICLE STRUCTURAL FRAME WITH PARTIAL-OVERLAP-BARRIER-IMPACT DEFORMATION SCHEME

TECHNICAL FIELD

The present disclosure relates to vehicle structural frames and impact mitigation.

BACKGROUND

Conventional vehicles include crash mitigation structure to reduce/manage deformation in the event of impact. Frontal impacts are, however, not always completely flush to the front end of the vehicle. At times an object or barrier can collide with the vehicle off-center. For example, one type of an off-centered vehicle impact is the overlap barrier impact defined as an impact spanning (or "overlapping") approximately less than 25% of the vehicle front end on one side. An overlap barrier impact may occur, e.g., during an oblique vehicle-to-vehicle or head-on tree/post/pole impact.

With respect to the overlap barrier impact, the Insurance Institute for Highway Safety (IIHS) is defining a new frontal impact crash mode protocol. It is expected that the protocol will require a vehicle to be impacted at 40 mph against a 25% overlap barrier. In order to meet this standard various structural designs have been considered. For example, one existing reference teaches a retractable strut pivotally connected to the inside of a side rail in the front-end assembly. See U.S. Pat. No. 3,853,344 titled "Impact Absorbing Bumper System." While this reference teaches a design that translates impact energy from one position on the front end of a vehicle to another, it does not appear to mitigate overlap barrier impact as the retractable strut is mounted inside of the side rail.

Therefore, it is desirable to have a vehicle structural frame with an overlap-barrier-impact deformation scheme that mitigates partial overlap barrier impact. It is further desirable to have a method of manufacturing the same.

SUMMARY

The present disclosure addresses one or more of the above-mentioned issues. Other features and/or advantages will become apparent from the description which follows.

One exemplary embodiment of the present disclosure relates to a vehicle structural frame with a partial-overlap-barrier-impact deformation scheme, the frame has: a rail defining a first longitudinal axis; a first energy absorption device defining a second longitudinal axis outside of the first longitudinal axis with respect to a vehicle; and a connector extending between the rail and the first energy absorption device.

Another exemplary embodiment of the present disclosure relates to a vehicle structural frame with a partial-overlap-barrier-impact deformation scheme, the frame includes: an engine cradle having a first rail extending in a longitudinal direction and a second rail extending in a vertical direction; and a blocker assembly connecting the first rail and second rail, the blocker assembly configured to resist rotation of the second rail in the vertical direction given application of a force in the longitudinal direction.

Additionally, another exemplary embodiment of the present disclosure relates to a method of manufacturing a vehicle structural frame with a partial-overlap-barrier-impact deformation scheme, the method including: attaching a first energy absorption device to a side rail at a position outside of the side rail with respect to a vehicle.

One advantage of the present disclosure is that a predetermined engagement between an object or barrier and the vehicle frame is enabled. The exemplary illustrated vehicle structural frames foster energy absorption in the underbody and assist in maintaining the structural integrity of the front vehicle frame. A 50% reduction in deformation on the front vehicle frame was measured using one configuration. Steering displacement was also significantly reduced. Impacts that overlap approximately 25% or less of the width of the vehicle are managed.

Another advantage of the exemplary vehicle structural frames is that they can be implemented on existing vehicles with minimal design changes. Pre-existing rails are part of the deformation scheme or lower load path, and with the disclosed structural frames, the rails are able to more fully engage a partial overlap barrier and absorb impact energy.

The present invention will be explained in greater detail below by way of example with reference to the figures, in which the same reference numbers are used in the figures for identical or essentially identical elements. The above features and the other features and advantages of the present teachings are readily apparent from the following detailed description of the best modes for carrying out the invention when taken in connection with the accompanying drawings.

DETAILED DESCRIPTION

Referring to the drawings, wherein like characters represent examples of the same or corresponding parts throughout the several views, there is shown exemplary vehicle support frames having a partial-overlap-barrier-impact deformation scheme that mitigates overlap-barrier impact. The structural frames are configured to tie in impact energy from a far side of a front of the vehicle into a vehicle main (or core) structural frame rails. The structural frames are also configured to reduce rotation of the engine cradle in the event of an impact on a far side of the front of the vehicle.

The structural frame assemblies are configured for implementation on a front-end of a vehicle frame assembly but can also be configured for rear impact. Though the illustrated embodiments are shown incorporated into a sedan, other embodiments of the vehicle structural frame can be included on pickup trucks, vans, minivans, sports utility vehicles, coupes, convertibles, commercial vehicles and all utility vehicles.

Figure 1:
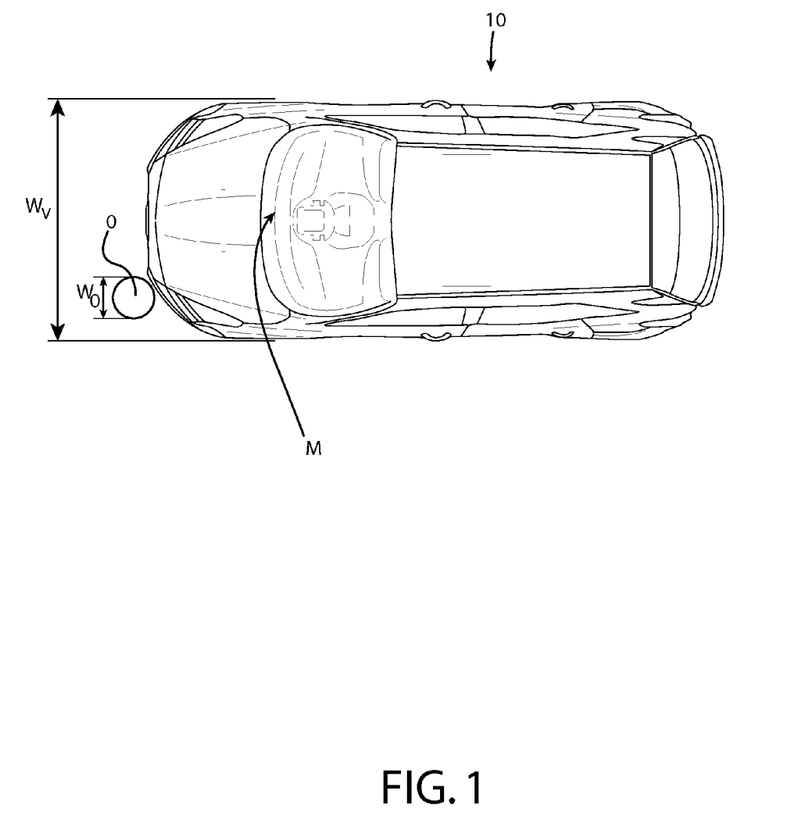
FIG. 1 is a top view of a vehicle in an overlap barrier impact situation.

Referring now to FIG. 1, there is shown therein a top view of a vehicle 10 in a 25% overlap barrier impact situation. The vehicle 10 illustrated is a sedan. The width of the vehicle is defined by $W_V$, as shown in FIG. 1. Vehicle is positioned for imminent impact with Object O. Object O has a width defined by $W_O$, as shown in FIG. 1. $W_O$ is approximately less than or equal to 25% of $W_V$. In this embodiment, the width of the Object O extends across approximately 25% of the width of the front of the vehicle on a far end or in this case the driver side. This type of frontal impact is a partial overlap barrier impact. Other partial overlap barrier impacts span 35% and 40% of the width of a vehicle. A non-partial overlap barrier impact would be a head-on collision or an impact overlapping 100% of the width of a front end of the vehicle.

Figure 2:
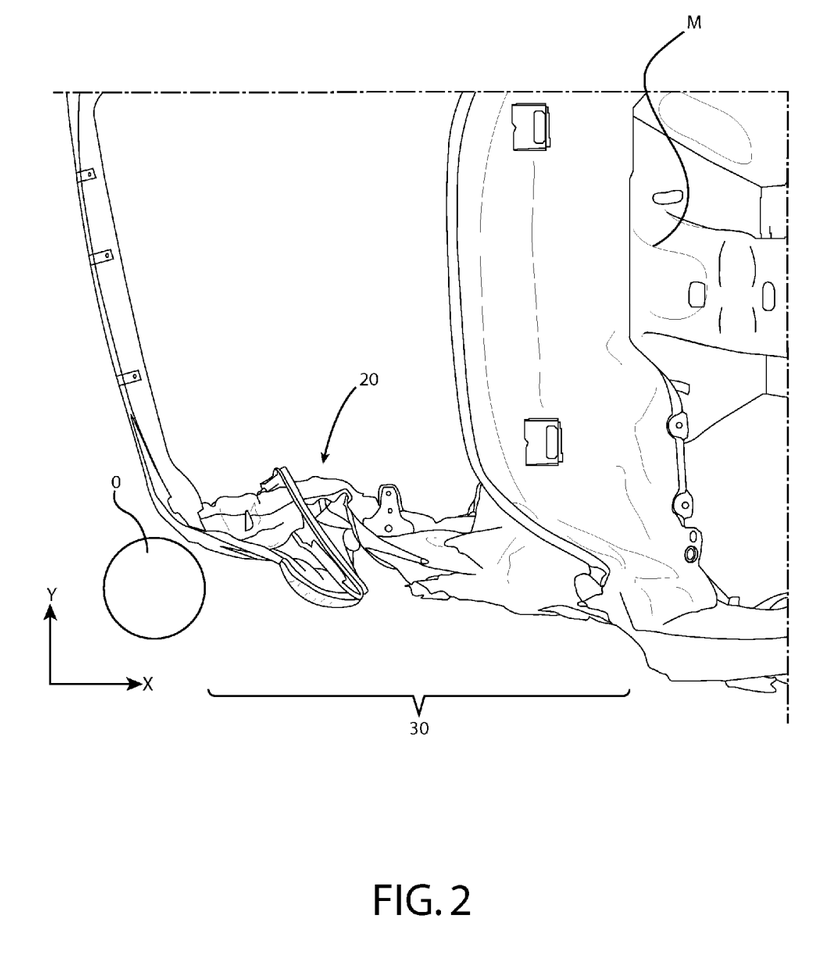
FIG. 2 is a top view the vehicle of FIG. 1, at a first elevation, with a vehicle structural frame having a partial-overlap-barrier-impact deformation scheme according to an exemplary embodiment of the present disclosure.

FIG. 2 shows a top view of a vehicle structural frame 20 used with the vehicle of FIG. 1. The structural frame 20 is shown post-collision with Object O. Vehicle structural frame 20 is configured with a partial-overlap-barrier-impact deformation scheme 30, as shown in FIG. 2. Upon impact with an object overlapping 25% or less of the width of the vehicle at a far end, vehicle structural frame 20 is configured to translate at least some linear impact energy into rotational energy. Ergo, linear deformation along the x-axis, as shown, is transferred in the direction of the y-axis as shown. The deformation scheme for vehicle structural frame 20 includes an inward rotation of side rails. Energy received outside of the side rail is tied back into the side rail. Inward is defined as a direction towards a center or middle section of the vehicle, M, with respect to the y-axis or width of the vehicle. Outward is defined as a direction away from the center or middle section of a vehicle, M. Vehicle structural frame 20 has a particular construction as discussed hereinbelow to enable this deformation scheme.

Figure 3:
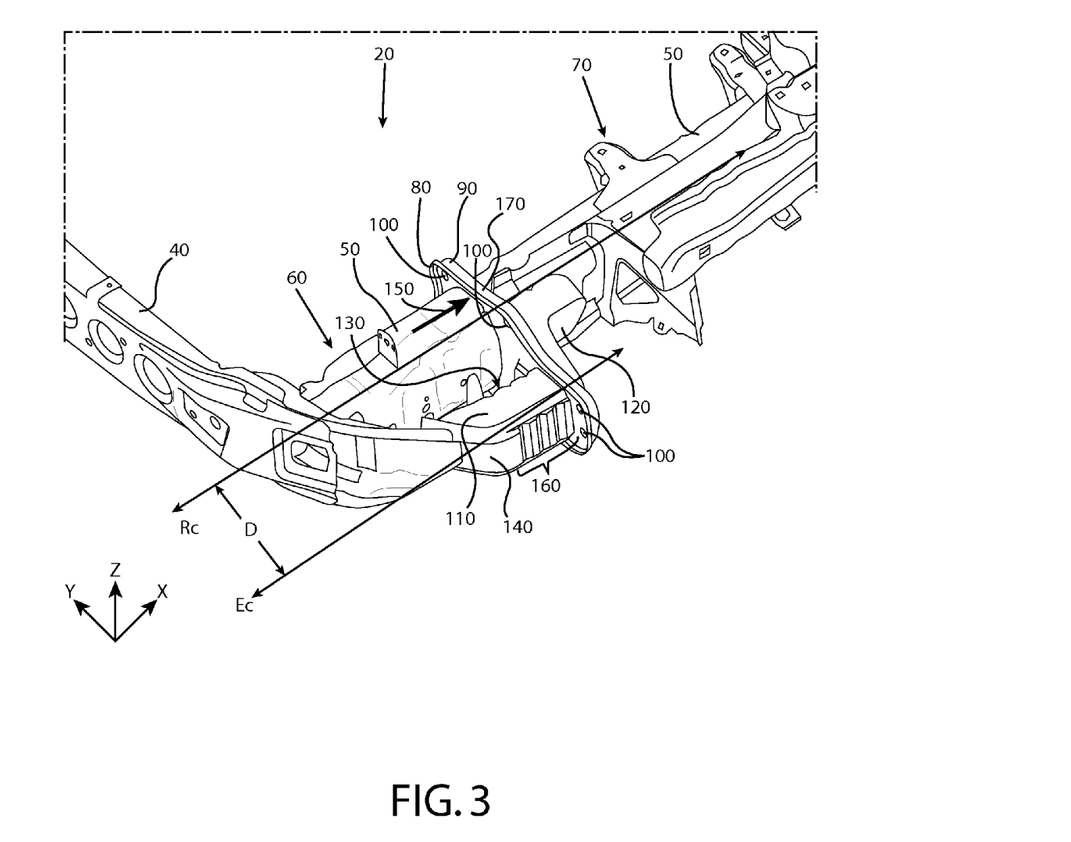
FIG. 3 is a perspective view of the vehicle structural frame of FIG. 2.

Now with reference to FIG. 3, there is shown therein the vehicle structural frame 20 of FIG. 2 in perspective view. Vehicle structural frame 20 is a core or main structural frame for the vehicle 10, as shown in FIG. 1. With respect to FIG. 3, frame 20 includes a bumper (or rail) 40 that extends laterally across the front of the vehicle. Bumper 40 extends parallel to the y-axis as shown. Rail 50 is perpendicularly disposed with respect to bumper 40. Rail 50 is configured to extend along the longitudinal axis of the vehicle or parallel to the x-axis as shown. A central axis of rail, $R_C$, is shown. Side rail 50 is divided into a front portion 60 and a rear portion 70. Between the front and rear portions 60, 70 are two connector plates 80, 90. Connector plates 80, 90 are a crush can front plate 80 and crush can rear plate 90. Connector plates 80, 90 are attachable via fasteners (not shown) that fit through complementary orifices 100 in plates. Connector plates 80, 90 attach to the side rail 50. Connector plates 80, 90 are also attached to two energy absorption devices 110, 120. Fewer or more than two connector plates can be used.

Energy absorption device 110, as shown in FIG. 3, is a crush can (or bumper "blocker") attached to connector plate 80. Crush can 110 is configured to deform on an inside surface 130 with respect to the vehicle. Crush can 110 defines a longitudinal axis, $E_C$, as shown. Longitudinal axis, $E_C$, is at a different position than the central longitudinal axis defined by side rail, $R_C$. A distance between $E_C$ and $R_C$ is indicated by D, as shown. Distance, D, can be larger or shorter than the spatial distance represented in this embodiment. Crush can 110 is partially housed by a cover 140. Cover 140 is also an outer bumper blocker. Cover 140 is attached to connector plate 80, crush can 110 and bumper 40. Cover 140 is also attached to side rail 50 at 150. Ridges 160 are formed on cover 140 on an outer surface of cover.

Energy absorption device 120 is aligned with or at least partially nested in rail 50. Energy absorption device 120 is attached to connector 90. Energy absorption device 120 is also attached to cover 140. Connector 90 is attached to rail 50 at 170.

Connectors 80, 90 are shown as plates in the illustrated embodiments. Connectors 80, 90 can be any mechanical link between the energy absorption devices and the structural rails including but not limited to linkages, tubes, or hinges. Additionally, a crush can is but one energy absorption device that can be used with the vehicle structural frames. Energy absorption devices absorb kinetic mechanical energy by compressing or deflecting relatively constant stress over an extended distance with or without rebounding. Other examples include foam structure, honeycomb inserts, springs or struts.

Figure 4:
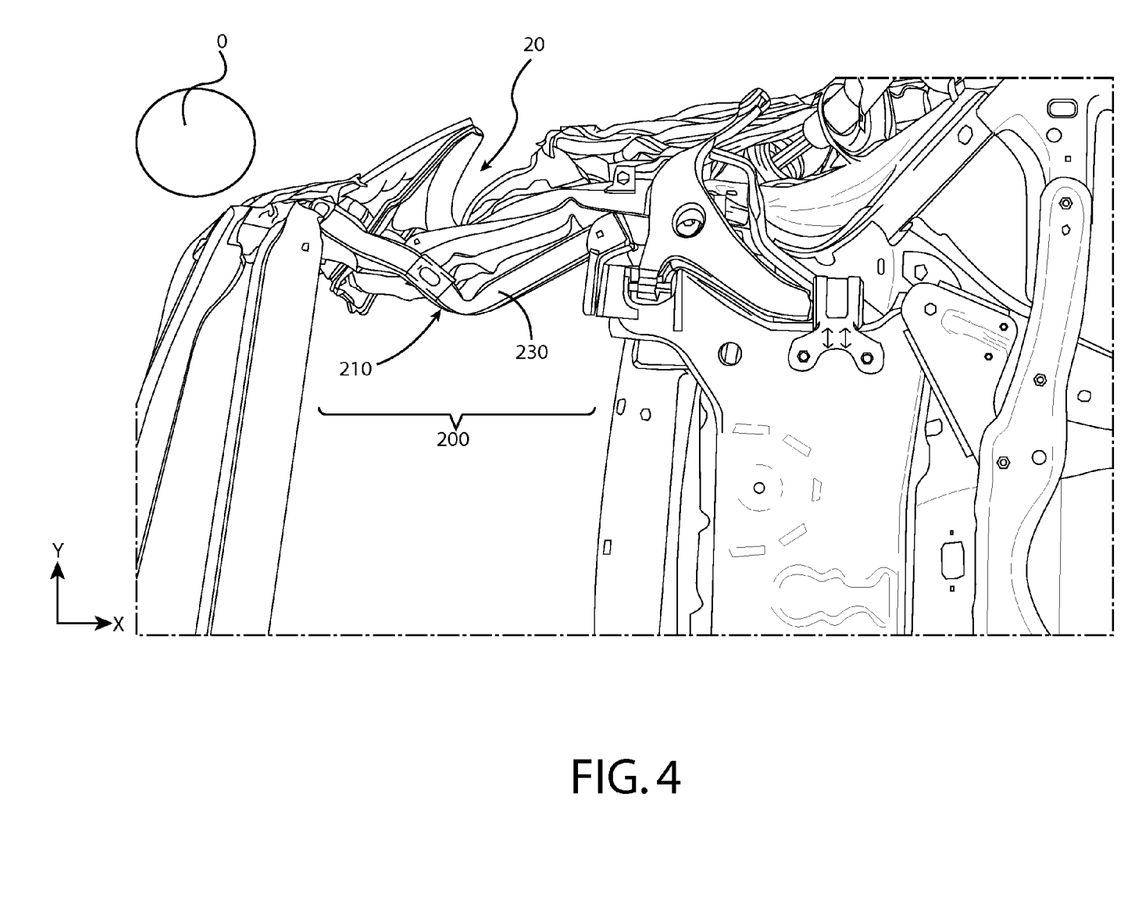
FIG. 4 is a bottom view of the vehicle of FIG. 1, at a second elevation, with vehicle structural frames having a partial-overlap-barrier-impact deformation scheme according to another exemplary embodiment of the present disclosure.
Figure 5:
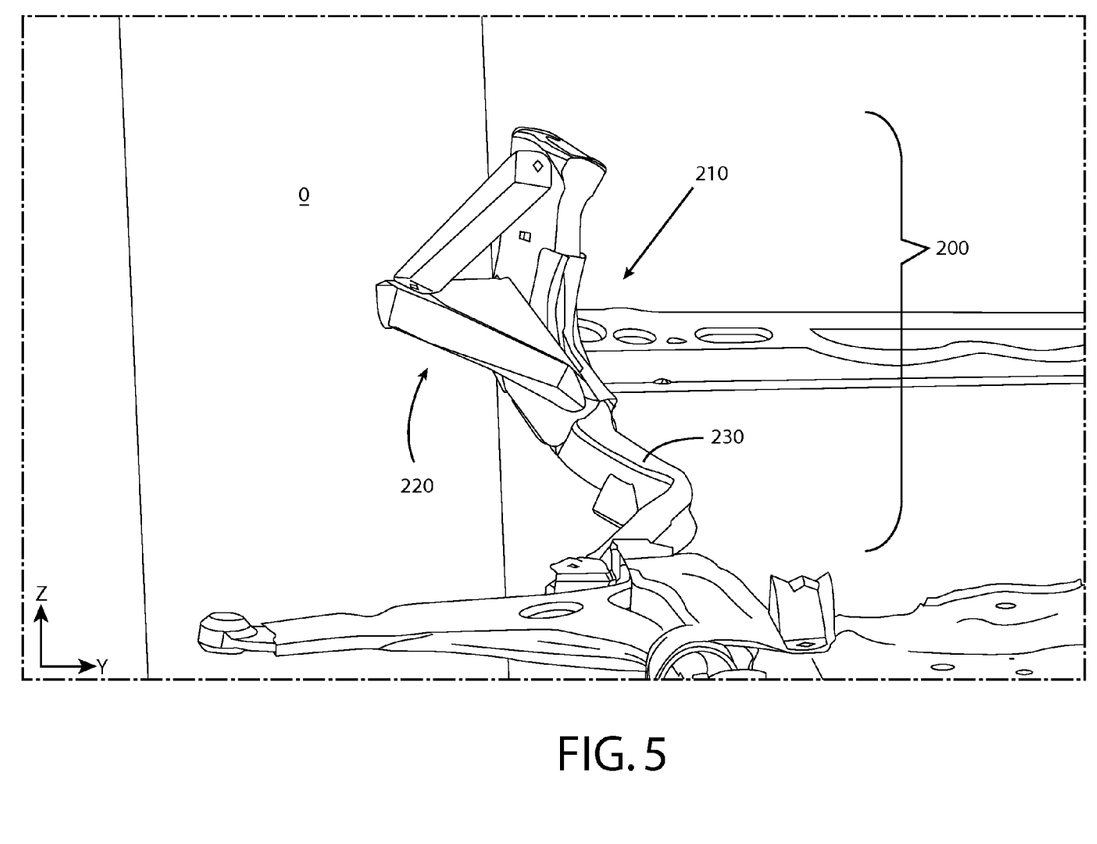
FIG. 5 is a perspective view of one vehicle structural frame from FIG. 4 further showing the partial-overlap-barrier-impact deformation scheme.

FIGS. 4 and 5 illustrate the deformation scheme 200 for another exemplary vehicle structural frame 210. FIG. 4 shows a bottom view of the vehicle 10 of FIG. 1 at another elevation. Another vehicle structural frame or sub-frame 210 is shown in FIG. 4 mounted underneath frame 20 of FIG. 2. The vehicle structural frame 210 is an engine cradle to which an internal combustion engine can be secured. As shown in FIG. 4, structural frames 20 and 210 are illustrated post-collision with Object O. Upon the partial overlap barrier impact, vehicle structural frame 210 is configured to translate at least some linear impact energy into rotational energy. Linear deformation along the longitudinal axis of the vehicle or the x-axis, as shown, is transferred in the direction of the y-axis or width of the vehicle. A blocker assembly 220, as shown in FIG. 5, resists rotation of rail 230 vertical axis of the vehicle, z-axis. Rail 230 is shown bent inwardly as a result of linear impact. Vehicle structural frame has a particular construction as discussed hereinbelow to enable this deformation scheme.

Figure 6:
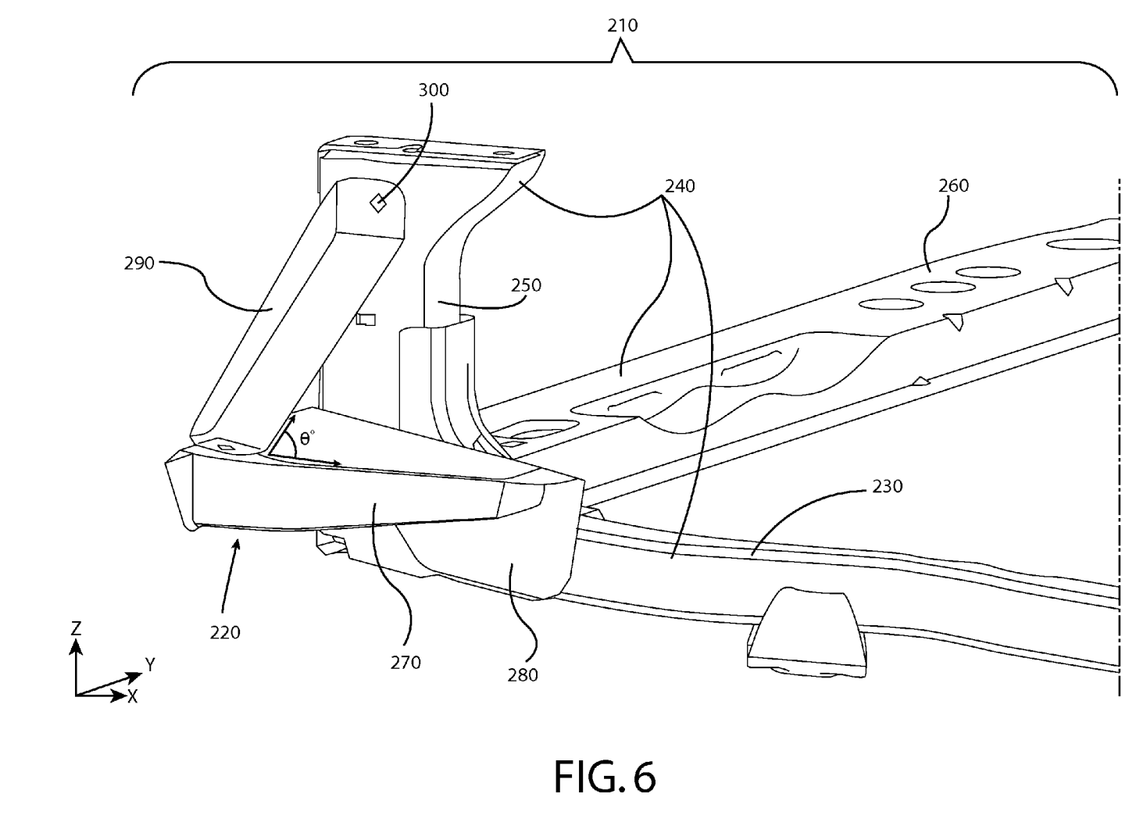
FIG. 6 is a perspective view of the vehicle structural frame of FIG. 5.

Now with reference to FIG. 6, there is shown therein the vehicle structural frame 210 of FIGS. 4-5 in perspective view. Vehicle structural frame 210 includes an engine cradle 240. Blocker assembly 220 is configured to resist rotation of rail 230 with respect to the z-axis during a partial overlap barrier impact, thus the deformation scheme transfers load to rail 250. Cradle 240 includes a rail 260 that extends laterally across the front of the vehicle. Rail 260 extends parallel to the y-axis as shown. Rail 260 is perpendicularly disposed with respect to rail 230. Rail 230 is configured to extend along the longitudinal axis of the vehicle or parallel to the x-axis as shown. Rail 250 is configured to extend along a vertical axis of the vehicle or in the direction of the z-axis.

Blocker assembly 220, as shown in FIG. 6, is attached to the engine cradle 240 at one end. Blocker assembly 220 includes a blocker 270 extending parallel to rail 230. Blocker assembly 220 is attached to rail 230 through flange 280. Blocker 270 is attached to an angularly disposed blocker arm 290. Blocker arm 290 is attached to rail 250 and blocker 270. An angle of theta, θ, is defined by the position of blocker arm 290 with respect to blocker 270. Blocker arm 290 is attached to rail 250 through fastener 300. Frame 210 can be incorporated in the same vehicle as frame 20 (as shown in FIG. 4) or either frame can be independently implemented into a vehicle.

The illustrated vehicle frames can be manufactured in accordance with an exemplary method of manufacturing. An exemplary method of manufacturing a vehicle structural frame with a partial-overlap-barrier-impact deformation scheme includes: attaching a first energy absorption device (e.g., 110 or 120 as shown in FIG. 3) to a side rail at a position outside of the side rail with respect to a vehicle. For example, the crush can 110 shown in FIG. 3 can be attached outside of side rail. The method can include incorporating a second energy absorption device in the side rail (e.g., 120 as shown in FIG. 3).

The method of manufacture can include manufacturing a vehicle structural frame with engine cradle, e.g., 240 as shown in FIG. 6. The method includes attaching a blocker assembly to an engine cradle, the blocker assembly configured to resist rotation of a vertical rail in a vertical direction; and mounting the engine cradle with respect to the side rail. An exemplary blocker assembly 220 is shown in FIGS. 5 and 6. One derivation of this process includes incorporating a blocker arm (e.g., 290 as shown in FIG. 6) into the blocker assembly.

Components in the illustrated vehicle structural frames can be composed of any material including, for example, aluminum, steel or magnesium. Each component can be manufactured using different manufacturing techniques, e.g., stamping, extrusion or welding.

Those familiar with the art to which this invention relates will recognize various alternative designs and embodiments for practicing the invention within the scope of the appended claims.

We claim:

1. A vehicle structural frame with a partial-overlap-barrier-impact deformation scheme, the frame comprising:
   a rail defining a first longitudinal axis;
   a first energy absorption device defining a second longitudinal axis outside of the first longitudinal axis with respect to a vehicle;
   a second energy absorption device positioned perpendicular to the first energy absorption device and partially nested to the rail; and
   a connector connecting the rail, the first energy absorption device, and the second energy absorption device, wherein the first energy absorption device and the second energy absorption device transfer linear deformation along the first longitudinal axis to an axis perpendicular to the first longitudinal axis.

2. The vehicle structural frame of claim 1, wherein the first energy absorption device is a crush can.

3. The vehicle structural frame of claim 1, wherein the connector includes a plate.

4. The vehicle structural frame of claim 3, further comprising:
   a cover for the first energy absorption device attached to the connector.

5. The vehicle structural frame of claim 1, further comprising:
   an engine cradle mounted atop the rail, the engine cradle including a blocker assembly configured to resist rotation of a vertical rail in a vertical direction.

6. The vehicle structural frame of claim 5, wherein the blocker assembly includes a blocker arm attached to the vertical rail.

7. A vehicle structural frame with a partial-overlap-barrier-impact deformation scheme, the frame comprising:
   an engine cradle including a first rail extending in a longitudinal direction;
   a second rail extending in a vertical direction; and
   a third rail extending perpendicular to the longitudinal direction; and
   a blocker assembly connecting the first rail, the second rail, and the third rail, the blocker assembly configured to resist rotation of the second rail in the vertical direction given application of a force in the longitudinal direction.

8. The vehicle structural frame of claim 7, wherein the blocker assembly includes a blocker attached to the first rail.

9. The vehicle structural frame of claim 7, wherein the blocker assembly includes a blocker arm attached to the blocker and second rail.

10. The vehicle structural frame of claim 7, further comprising:
    a first energy absorption device extending in the longitudinal direction, mounted outside of the first rail with respect to a vehicle; and
    a connector extending between the first rail and the first energy absorption device.

11. The vehicle structural frame of claim 10, wherein the first energy absorption device is a crush can.

12. The vehicle structural frame of claim 10, further comprising:
    a second energy absorption device aligned with the first rail and connected to first energy absorption device via the connector.

13. The vehicle structural frame of claim 12, wherein the connector includes a plate.

14. The vehicle structural frame of claim 12, further comprising:
    a cover for the first energy absorption device attached to the connector.

15. A method of manufacturing a vehicle structural frame with a partial-overlap-barrier-impact deformation scheme, comprising:
    attaching a first energy absorption device to a side rail at a position outside of the side rail with respect to a vehicle;
    providing a second rail perpendicular to the side rail;
    providing a vertical third rail;
    attaching the side rail with the second rail with a blocker; and
    connecting the blocker and the vertical third rail with a blocker arm, wherein the blocker and the blocker arm resist rotation of the vertical third rail in a vertical direction.

16. The method of claim 15, further comprising:
    incorporating a second energy absorption device in the side rail.

17. The method of claim 16, further comprising:
    attaching the second energy absorption device to the first energy absorption device.

* * * * *